United States Patent
Hensley et al.

(10) Patent No.: US 11,169,810 B2
(45) Date of Patent: Nov. 9, 2021

(54) MICRO-OPERATION CACHE USING PREDICTIVE ALLOCATION

(71) Applicant: Samsung Electronics Co., Ltd., Suwon-si (KR)

(72) Inventors: Ryan J. Hensley, Austin, TX (US); Fuzhou Zou, Austin, TX (US); Monika Tkaczyk, Austin, TX (US); Eric C. Quinnell, Austin, TX (US); James David Dundas, Austin, TX (US); Madhu Saravana Sibi Govindan, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 74 days.

(21) Appl. No.: 16/374,743

(22) Filed: Apr. 3, 2019

(65) Prior Publication Data
US 2020/0210190 A1 Jul. 2, 2020

Related U.S. Application Data

(60) Provisional application No. 62/786,324, filed on Dec. 28, 2018.

(51) Int. Cl.
*G06F 9/30* (2018.01)
*G06F 9/38* (2018.01)

(52) U.S. Cl.
CPC .......... *G06F 9/3804* (2013.01); *G06F 9/3016* (2013.01); *G06F 9/30058* (2013.01)

(58) Field of Classification Search
None
See application file for complete search history.

(56) References Cited

U.S. PATENT DOCUMENTS

| 6,073,213 | A | 6/2000 | Peled et al. |
| 6,167,536 | A | 12/2000 | Mann |
| 6,185,675 | B1 | 2/2001 | Kranich et al. |
| 6,950,903 | B2 * | 9/2005 | Solomon ............... G06F 9/3836 711/119 |
| 6,988,190 | B1 | 1/2006 | Park |
| 7,519,799 | B2 | 4/2009 | Hebda et al. |
| 7,546,420 | B1 | 6/2009 | Shar et al. |
| 8,103,831 | B2 * | 1/2012 | Rappoport ............ G06F 1/3203 711/125 |

(Continued)

FOREIGN PATENT DOCUMENTS

KR 20050095107 A 9/2005

*Primary Examiner* — Corey S Faherty
(74) *Attorney, Agent, or Firm* — Renaissance IP Law Group LLP

(57) ABSTRACT

According to one general aspect, an apparatus may include an instruction fetch unit circuit configured to retrieve instructions from a memory. The apparatus may include an instruction decode unit configured to convert instructions into one or more micro-operations that are provided to an execution unit circuit. The apparatus may also include a micro-operation cache configured to store micro-operations. The apparatus may further include a branch prediction circuit configured to: determine when a kernel of instructions is repeating, store at least a portion of the kernel within the micro-operation cache, and provide the stored portion of the kernel to the execution unit circuit without the further aid of the instruction decode unit circuit.

18 Claims, 4 Drawing Sheets

(56) References Cited

U.S. PATENT DOCUMENTS

| | | |
|---|---|---|
| 8,127,085 B2 | 2/2012 | Rappoport et al. |
| 8,725,958 B2 | 5/2014 | Takata |
| 9,600,418 B2 | 3/2017 | Whalley et al. |
| 2012/0151232 A1 | 6/2012 | Fish, III |
| 2014/0157022 A1 | 6/2014 | Wang et al. |
| 2015/0248295 A1 | 9/2015 | Michalak et al. |
| 2017/0068539 A1 | 3/2017 | Dundas et al. |
| 2017/0293556 A1 | 10/2017 | Rozario |
| 2018/0165096 A1* | 6/2018 | Suggs .................. G06F 9/3808 |

* cited by examiner

MICRO-OPERATION CACHE USING PREDICTIVE ALLOCATION

CROSS-REFERENCE TO RELATED APPLICATION

This application claims priority under 35 U.S.C. § 119 to Provisional Patent Application Ser. No. 62/786,324, entitled "A POWER-SAVING MICRO-OPERATION CACHE USING LINKED-LIST PREDICTORS" filed on Dec. 28, 2018. The subject matter of this earlier filed application is hereby incorporated by reference.

TECHNICAL FIELD

This description relates to fetching instructions for a processor, and more specifically to a micro-operation cache using predictive allocation.

BACKGROUND

In computer processing units, micro-operations (micro-ops, μops, or uops) are often detailed low-level instructions used in some designs to implement complex machine instructions (sometimes termed macro-instructions in this context). Usually, micro-operations perform basic operations on data stored in one or more registers, including transferring data between registers or between registers and external buses of the central processing unit (CPU), and performing arithmetic or logical operations on registers. In a typical fetch-decode-execute cycle, each step of a macro-instruction is decomposed during its execution, so the processor may determine and step through a series of micro-operations. The execution of micro-operations is performed under control of the processor's control unit, which decides on their execution while performing various optimizations such as reordering, fusion and caching.

The instruction cycle (also known as the fetch-decode-execute cycle or the fetch-execute cycle) is generally the basic operational process of a computer system. It is the process by which a computer retrieves a program instruction from its memory, determines what actions the instruction describes, and then carries out those actions. This cycle is repeated continuously by a computer's central processing unit (CPU), from boot-up until the computer has shut down.

Processors, especially mobile processors, are generally constrained by power consumption in two major ways: battery life of the mobile devices they power and performance throttling due to thermal limitations. Major reductions in power consumption without performance penalties are therefore sought after in the advancement of CPU micro-architecture.

SUMMARY

According to one general aspect, an apparatus may include an instruction fetch unit circuit configured to retrieve instructions from a memory. The apparatus may include an instruction decode unit configured to convert instructions into one or more micro-operations that are provided to an execution unit circuit. The apparatus may also include a micro-operation cache configured to store micro-operations. The apparatus may further include a branch prediction circuit configured to: determine when a kernel of instructions is repeating, store at least a portion of the kernel within the micro-operation cache, and provide the stored portion of the kernel to the execution unit circuit without the further aid of the instruction decode unit circuit.

According to another general aspect, a system may include an instruction cache configured to store instructions. The system may include an instruction fetch and decode circuit configured to: retrieve instructions from the instruction cache, and convert instructions into one or more micro-operations that are provided to an execution unit circuit. The system may include a micro-operation cache configured to store micro-operations. The system may include a branch prediction circuit configured to: determine when a kernel of instructions is repeating, store at least a portion of the kernel within the micro-operation cache, and provide the stored portion of the kernel to the execution unit circuit without the further aid of the instruction cache.

According to another general aspect, an apparatus may include an instruction cache to store instructions. The apparatus may include an instruction fetch pipeline circuit configured to provide instructions, from the instruction cache to an execution unit circuit. The instruction fetch pipeline circuit may include a first instruction path and a second instruction path. The first instruction path may include a fetch circuit configured to retrieve instructions from the instruction cache, and a decode circuit configured to convert the instructions into one or more micro-operations and supply the micro-operations to the execution unit circuit. The second instruction path may include a micro-operation cache configured to store micro-operations, and a branch prediction circuit. The branch prediction circuit may be configured to: determine when a kernel of instructions is repeating, store at least a portion of the kernel within the micro-operation cache, and provide the stored poriton of the kernel to the execution unit circuit when the first instruction path is in a low power mode.

The details of one or more implementations are set forth in the accompanying drawings and the description below. Other features will be apparent from the description and drawings, and from the claims.

A system and/or method for fetching instructions for a processor, and more specifically to a micro-operation cache using predictive allocation, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
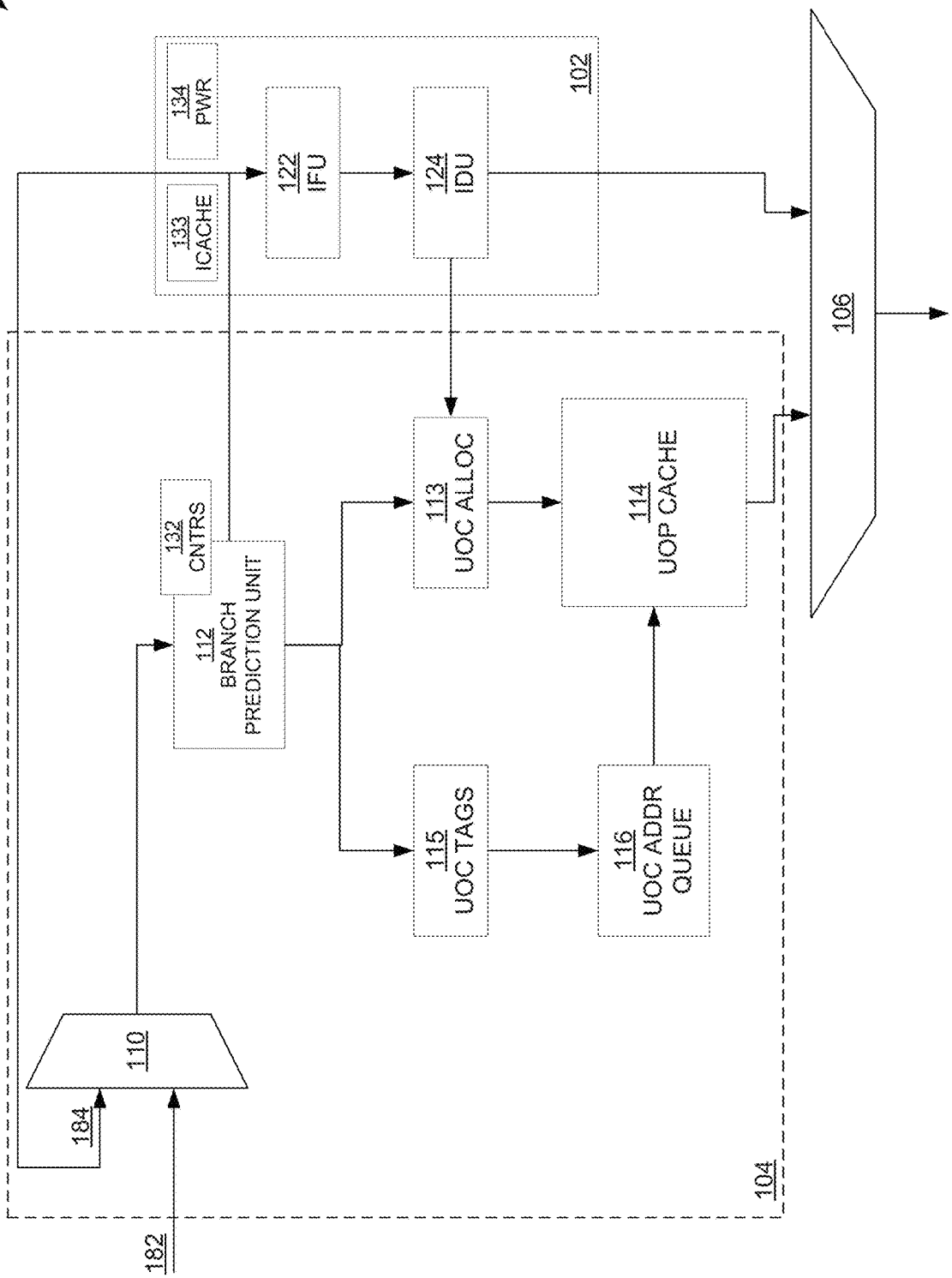
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may be part of a processor (e.g., central processing unit, graphical processing unit (GPU), system-on-a-chip (SoC), specialized controller processor, etc.), or any pipelined architecture. In various embodiments, the system 100 may be included in a computing device, such as, for example, a laptop, desktop, workstation, personal digital assistant, smartphone, tablet, and other appropriate computers or a virtual machine or virtual computing device thereof.

In various embodiments, the system 100 may illustrate part of the beginning of a pipelined architecture (e.g., the traditional five stage reduced instruction set (RISC) architecture). In the illustrated embodiment, the system 100 may include an instruction fetch stage, in which instructions are retrieved or fetched from a system memory (not shown) or an instruction cache 133. The system 100 may then decode the instruction, determining which execution unit (not shown) will perform the instruction, and converting the larger instruction into one or more micro-operations. These micro-operations may then be forwarded to the execution unit for processing.

In the illustrated embodiment, the fetch stage may primarily be performed by an instruction fetch unit circuit (IFU) 122. The decode stage may primarily be formed by an instruction decode unit circuit (IDU) 124. It is understood that the above are merely a few illustrative examples to which the disclosed subject matter is not limited.

In the illustrated embodiment, the system 100 may include a uop kernel circuit 104. In various embodiments, the uop kernel circuit 104 may be included as part of the IFU 122, the IDU 124 or as part of both of them. In such an embodiment, the uop kernel circuit 104 may be configured to store uops, provide the uops to the execution unit, and to perform the duties of (part of) the IFU 122 and IDU 124 when those circuits are in a low power mode.

In such an embodiment, the uop kernel circuit 104 may include a uop cache 114. The uop cache (UOC) 114 may be configured to store uops for further use. These uops may originally be provided by the IDU 124.

In the illustrated embodiment, the uop kernel circuit 104 may also include a UOC tag circuit 115 configured to store the tags and metadata associated with the uops stored in the UOC 114. The uop kernel circuit 104 may include an UOC address queue circuit 116 configured to maintain a sequence of uops to be added to the UOC 114. The uop kernel circuit 104 may further include a UOC allocation circuit 113 configured to determine if the UOC 114 has space for an additional uop, and allocate space (e.g., via eviction if necessary) of the uop.

In the illustrated embodiment, the uop kernel circuit 104 may include the branch prediction unit or circuit 112. In various embodiments, the branch prediction unit 112 may be configured to predict which instruction will be the next to be executed. In various embodiments, the branch prediction unit 112 may include a branch graph, an edge graph, a branch edge graph, or even a linked-list predictor. In one specific embodiment, the branch prediction unit 112 may include a similar to the one that described in HIGH PERFORMANCE ZERO BUBBLE CONDITIONAL BRANCH PREDICTION USING MICRO BRANCH TARGET BUFFER (US Publication No. 2017/0068539A1 and incorporated herein by reference). This or other branch graph predictors may be configured to learn links or edges through both TAKEN and NOT TAKEN predictions. They may include finite resources that can correlate with a useable ratio or metric to the finite resources in the UOC 114, and may also include circuitry to determine if a full kernel is present throughout the links and is both predictable and repeatable. It is understood that the above is merely one illustrative example to which the disclosed subject matter is not limited.

In the illustrated embodiment, the system 100 may receive either a sequential instruction 182 or a predicted instruction 184. The selector circuit 110 (e.g., a multiplexer (MUX)) may select between the two instructions. The selected instruction may be input into a branch prediction unit or circuit 112. The branch prediction unit 112 may be configured to guess or predict what the next instruction to be executed by the processor.

During a normal operation, the branch prediction unit 112 may provide the predicted instruction 184 to the IFU 122. The IFU 122 may retrieve the instruction from the instruction cache (i-cache) 133. The instruction may then be processed by the IDU 124, which either retrieves the desired uop from the UOC 114 or acquires it from a micro-code storage, such as, a read only memory (ROM) or another source.

The selector circuit 106 (e.g., a multiplexer (MUX)) may select between the two uops. The selector circuit 106 then forwards the selected uop to the execution unit (not shown).

In the illustrated embodiment, the branch prediction unit 112 may be configured monitor the instructions and determine when a series of instructions is repeating or in a loop. Programs frequently loop or perform repeatable operations. If so, the branch prediction unit 112 may begin to store uops from the loop or kernel of instructions in the UOC 114. Once a sufficient amount (e.g., majority or all) of the kernel is stored in the UOC 114, the uop kernel circuit 104 or branch prediction unit 112 may place, in whole or parts, the IFU 122, IDU 124 and/or i-cache 133 (collectively circuits 102) in a low power mode. In the illustrated embodiment, the branch prediction unit 112 may control, at least in part, the power down or power mode circuitry 134. In such an embodiment, the system 100 may save power by disabling a portion (e.g., circuits 102) of the system 100's circuitry.

In such an embodiment, if the program or instruction stream breaks out of the cached kernel (e.g., a cache miss in the UOC 114), the circuits 102 may be awoken or removed from low power mode. The circuits 102 may then provide the needed uop to the selector 106. In various embodiments, the system 100 may power down the circuits 102 during periods of predictable kernels of instructions, awaking the circuits 102 to provide new instructions, handle unpredictable instruction streams, or very large kernels (e.g., that do not fit within the UOC 114). It is understood that the above are merely a few illustrative examples to which the disclosed subject matter is not limited.

Figure 2:
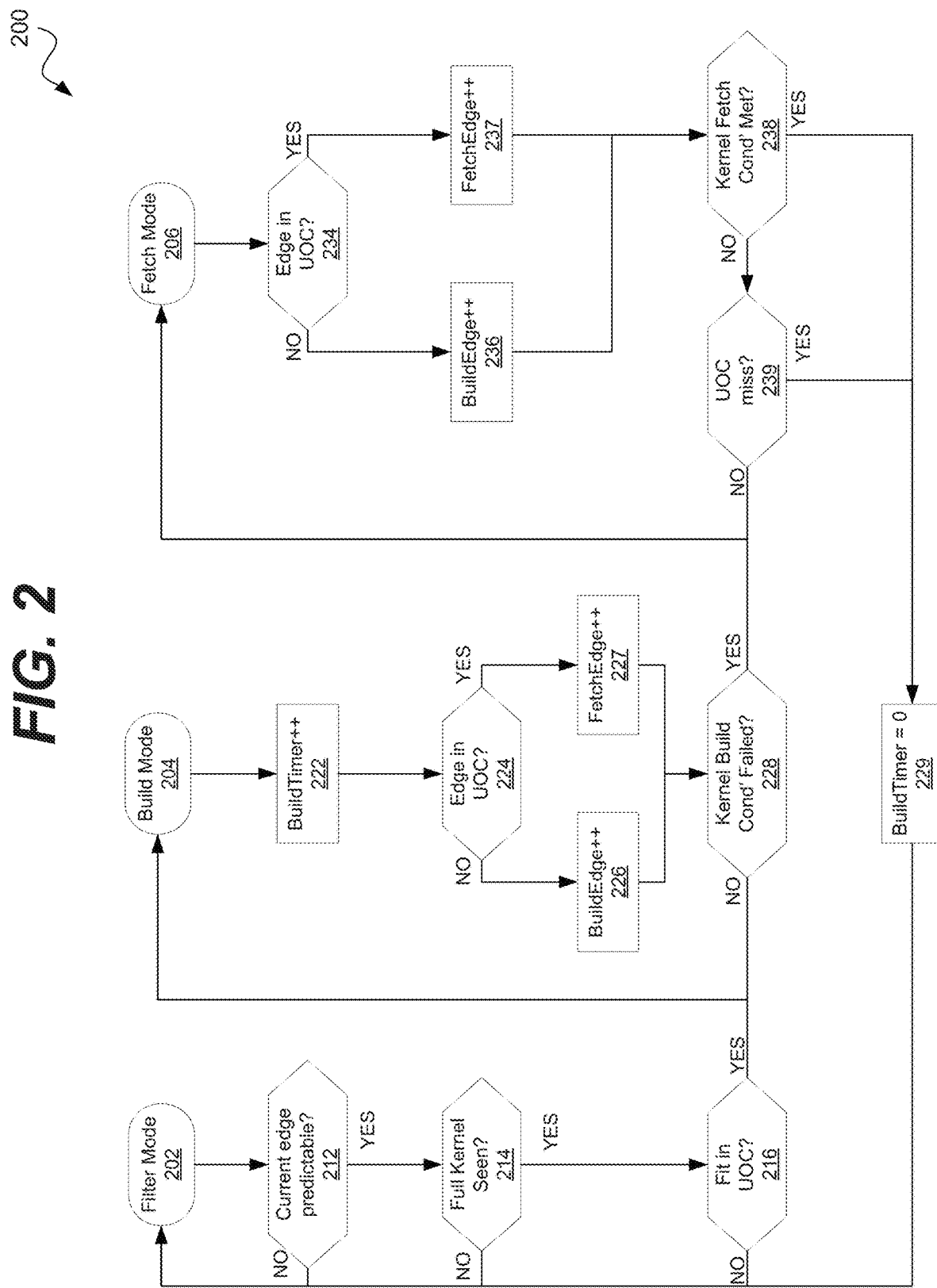
FIG. 2 is a flowchart of an example embodiment of a technique in accordance with the disclosed subject matter.

In various embodiments, the branch prediction unit 112 may include one or more counters 132 or flags FIG. 2 is a flowchart of an example embodiment of a technique 200 in accordance with the disclosed subject matter. In various embodiments, the technique 200 may be implemented or performed by a branch prediction unit or system (e.g., as shown in FIG. 1).

In the illustrated embodiment, the branch prediction unit may (in addition to its traditional branch prediction duties) in three modes of operation: filter mode 202, build mode 204, and fetch mode 206. In filter mode 202 the branch prediction unit may be configured to determine if the current kernel of instructions may be sufficiently stored in the uop cache (UOC) that the IFU and IDU circuity (or portions thereof) may be powered down. In the build mode 204, the branch prediction unit may be configured to store the kernel within the UOC. Once the kernel is sufficiently or wholly stored, the branch prediction unit, and system, may move to the fetch mode 206 in which the IFU and IDU circuity (or portions thereof) may be powered down and the kernel supplied out of the UOC. In such an embodiment, if a UOC miss occurs the IFU, et al. may be awoken and the branch prediction unit may return to filter mode 202.

In the illustrated embodiment, the three modes are generally represented by three columns of actions. Each column corresponds to actions within the mode labeled at the top of the columns.

During normal operation the system or branch prediction unit may be in filter mode 202. The IFU, et al. may be powered up and providing instructions and uops to the execution units. In one embodiment, the UOC may not be active during filter mode 202 or may only be used by the IDU.

Block 212 illustrates that, in one embodiment, the branch prediction unit may determine if the current edge is predictable. In the illustrated embodiment, the metric for using the UOC as the source of uops may be kernel predictability, not frequency of instructions. In this context, "edges" are defined as the learned links between a predictable branch and its TAKEN and NOT TAKEN branch descendants. In this context, "edge graphs" are defined as a graph or map of known edges and their interconnectivity. In such an embodiment, a complete edge graph may indicate a fully-discovered repeating kernel, which may be a good candidate for serving from the UOC.

Block 214 illustrates that, in one embodiment, the branch prediction unit may determine if the full kernel has been seen. Block 216 illustrates that, in one embodiment, a determination may be made as to whether or not the kernel may fit in the UOC. If the answer to any of these three questions is "no", the branch prediction unit may stay in filter mode 202, and the uops may be serviced from the normal IFU/IDU pipeline.

However, if a good candidate for UOC usage (e.g., a small predictable kernel) has been found, the branch prediction unit may enter build mode 204. In such an embodiment, during build mode 204, the branch prediction unit may be configured to allocate, within the UOC, streams of basic blocks of uops corresponding to predicted edges.

As described above, the branch prediction unit may include a number of counters. These counters may include a time-out counter (e.g., BuildTimer) to enforce a minimum an amount of time to fetch and store the kernel within the micro-operations cache. The counters may include an amount stored counter (e.g., FetchEdge) to indicate how much of the kernel is stored in the micro-operations cache. The counters may include an amount to store counter (e.g., BuildEdge) to indicate how much of the kernel is not yet or needs to be stored in the micro-operations cache. It is understood that the above are merely a few illustrative examples to which the disclosed subject matter is not limited.

Block 222 illustrates that, in one embodiment, for each cycle or instructions fetched the time-out counter may be increased (or decreased depending upon the embodiment). In such an embodiment, this may provide a minimum cycle time as some loops cross links/edge less frequently than others and may be given more or less time to be stored. The time-out counter may eventually be compared to a threshold value (which if the counter decrements may be zero).

Block 224 illustrates that, in one embodiment, a determination may be made as to whether or not the edge and all related uops have been already stored in the UOC. In various embodiments, the kernel or loop may not be a straightforward circle. In such an embodiment, the kernel may include more complex repetitions of the instructions. In various embodiments, the determination may include checking the UOC's tags or other metadata.

Block 226 illustrates that, in one embodiment, if the uops has not been stored in the UOC, it may be fetched from IDU and placed in the UOC. One is reminded that during build mode 204, the IFU/IDU are power on and operating normally (i.e., supplying the instructions/uops from their pipeline). The purpose of build mode 204 is to properly load the UOC before turning off or powering down the IFU/IDU circuitry. Further, the amount to be stored counter (e.g., BuildEdge) may be incremented.

Block 227 illustrates that, in one embodiment, if the uops have already been stored in the UOC, the amount stored counter (e.g., FetchEdge) may be incremented. In various embodiments, the amount stored counter (e.g., FetchEdge) and amount to store counter (e.g., BuildEdge) may be the same counter and may increment and decrement accordingly.

Block 228 illustrates that, in one embodiment, a determination may be made as to whether the branch prediction unit should stay in build mode 204 or move to fetch mode. In one embodiment, the build conditions may include (1) determining if the time-out counter (e.g., BuildTimer) has met the desired threshold value (i.e., has enough time been spent in build mode 204?), and (2) is the ratio of the amount stored counter (e.g., FetchEdge) to the amount to store counter (e.g., BuildEdge) sufficiently high or meet a threshold value (i.e., have enough uops been stored to allow fetch mode 206 to continue for a sufficient amount of time before a UOC miss occurs?). In various embodiments, the ratio may be twice as many stored to "need to be stored" uops. As described below, the ration to enter fetch mode 206 may be greater than the ration needed to exit fetch mode 206. It is understood that the above is merely one illustrative example to which the disclosed subject matter is not limited.

In the illustrated embodiment, fetch mode 206 may be the IFU, et al. (e.g., the instruction cache, the IDU or parts thereof) to be placed in a low power mode and the execution units to be supplied with operations from the UOC. In such an embodiment, this may continue until a terminating event occurs. In various embodiments, such a terminating event may include either a missing link or edge is encountered, or until the current kernel or predictor migrates to new code. Should the software move on to a different realm, the newly allocated predictor links will indicate that the "to be stored" counter (e.g., BuildEdge) out-paces the stored counter (e.g., FetchEdge), and thus the desire for the branch predictor to build a new section or kernel into the UOC.

Block 234 illustrates that, in one embodiment, as an edge is encountered, a determination may be made as to whether or not the uops associated with an edge or part of the kernel are stored in the UOC. If so, the stored counter (e.g., FetchEdge) may be incremented (Block 237). If not, the "to be stored" counter (e.g., BuildEdge) may be incremented 236.

Block 238 illustrates that, in one embodiment, a determination may be made as to whether the kernel fetch conditions are met. Block 239 illustrates that, in one embodiment, a determination may be made as to whether a UOC cache miss occurred (i.e., the desired uop was nowhere within the UOC and needs to be provided from somewhere else). If either of these conditions are met, the branch prediction unit may exit fetch mode 206, returning (in one embodiment) to filter mode 202. As part of this the time-out counter (e.g., BuildTimer) may be reset to a default value (Block 229).

In various embodiments, the system may exit from fetch mode 206 to build mode 204, if the system feels that a minor or manageable omission in the UOC has occurred and not that the software has moved on to another kernel entirely. It is understood that the above is merely one illustrative example to which the disclosed subject matter is not limited.

In various embodiments, the kernel fetch conditions of Block 238 may again include a ratio of the ratio of the amount stored counter (e.g., FetchEdge) to the amount to store counter (e.g., BuildEdge). In such an embodiment, if that ratio is insufficiently high, the kernel fetch condition may not be met, and the system may exit fetch mode 206.

In some embodiments, the ratio for the kernel fetch condition may be one, or otherwise lower than the ratio threshold of the kernel build condition (Block 228). In such an embodiment, the system may employ a hysteresis effect to switch in and out of the fetch mode. In such an embodiment, the system may be preventing from thrashing in and out of fetch mode, and hence powering down/up the IFU, et al. In such an embodiment, the greater the hysteresis width, the greater the cushion for switching modes. In some embodiments, a UOC miss may cause an exit from fetch mode 206 regardless of the ratio of the amount stored counter (e.g., FetchEdge) to the amount to store counter (e.g., BuildEdge).

In the illustrated embodiment, the amount stored counter (e.g., FetchEdge) and the amount to store counter (e.g., BuildEdge) may continue to be updated. In another embodiment, the counters may be reset (e.g., when entering build mode 204).

Figure 3:
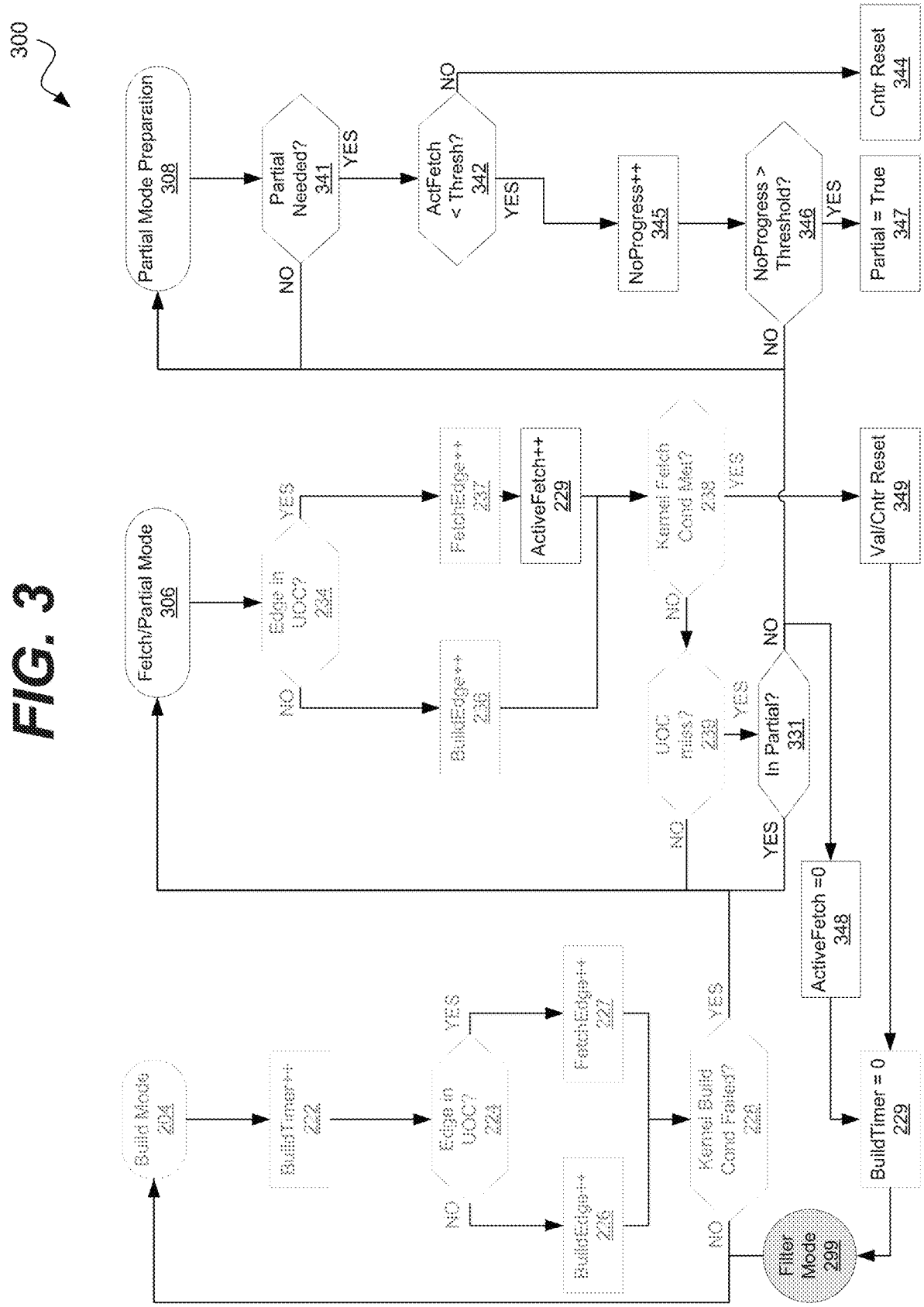
FIG. 3 is a flowchart of an example embodiment of a technique in accordance with the disclosed subject matter.

FIG. 3 is a flowchart of an example embodiment of a technique 300 in accordance with the disclosed subject matter. In the illustrated embodiment, the technique 300 builds upon and modifies the technique 200 of FIG. 2, as described above. In various embodiments, the technique 300 may be implemented or performed by a branch prediction unit or system (e.g., as shown in FIG. 1).

In the illustrated embodiment, the system or branch prediction unit may include a fourth mode or a variation of the third, fetch mode. In a preferred embodiment, the UOC will attempt to store a full kernel, with the goal being to never have to break out of fetch mode until the software has moved to a different kernel or stream of instructions. However, that may not be possible. For example, in various embodiments, the kernel may be too large to fit into the UOC or may be too unpredictable or complex to fully map. In such an embodiment, the technique 300 allows for partial caching of the kernel while reducing the amount of time the branch prediction unit would enter/exit fetch mode.

In the illustrated embodiment, filter mode 299 is represented by a single circle, due to space limitations. In such an embodiment, the expanded version of filter mode 299 may be substantially similar to that shown in FIG. 2. In filter mode 299 the branch prediction unit may be configured to determine if the current kernel of instructions may be sufficiently stored in the uop cache (UOC) that the IFU and IDU circuitry (or portions thereof) may be powered down.

Likewise, while fully displayed, the operations of build mode 204 may also be substantially similar to those described in relation to FIG. 2. Again, in the build mode 204, the branch prediction unit may be configured to store the kernel within the UOC. Once the kernel is sufficiently or wholly stored, the branch prediction unit, and system, may move to the fetch mode 206 in which the IFU and IDU circuitry (or portions thereof) may be powered down and the kernel supplied out of the UOC.

In various embodiments, the fetch/partial mode 306 may be thought of as a new mode that is separate to but similar to the fetch mode 206 of FIG. 2, or in another embodiment, may be thought of as a variation of the third mode, fetch mode. In such an embodiment, the UOC allocation and fetch flows may be altered to allow a partial kernel that is repeatable, but lacks sufficient resources to fully fetch from the UOC, or is unable after many attempts to capture the entire kernel's loop.

In such an embodiment, should a kernel iterate between the build and fetch modes continuously or frequently (e.g. due to UOC cache misses), the Partial Loop mode may cause the system or branch prediction unit to start tracking build progress of the present system and method. On subsequent fetch mode iterations on the same kernel, should the appropriate counters (described below) indicate, a flag or bit may be set to prevent future UOC tag misses from exiting the fetch mode. Although, the UOC miss would still remove the IFU et al. from low power mode as the needed uop must be supplied, but the system would return to using the built partial kernel after the cache miss has been fulfilled. This Partial Loop mode may allow for most of an unfinished kernel to be fetched from the UOC, but may not provide the power saving (or a lower amount of power saving) than the full kernel technique described in FIG. 2.

In the illustrated embodiment, the Blocks 234, 236, and 237 may occur as described above. Block 229 illustrates that, in one embodiment, when in fetch/partial mode 306 a successful fetch counter (e.g., ActiveFetch) may be used to track how many times successful UOC fetches actually occurred.

In the illustrated embodiment, the Blocks 238 and 239 may perform the same checks as described above. However, their exit points or next steps may differ in fetch/partial mode 306. Block 349 illustrates that, if the kernel fetch condition is met (Block 238), meaning there is too little of the kernel stored to warrant staying in fetch/partial mode 306, the various partial mode 306 counters and flags (e.g., ActiveFetch, PartialKernel, etc.) may be reset to default values before returning to filter mode 299.

Block 331 illustrates that, in one embodiment, if the system would normally exit fetch mode 306 due to a UOC miss (Block 239), that a check may be made as to whether or not the system is in fetch/partial mode 306 (of FIG. 3) or the full fetch mode (of FIG. 2). In such an embodiment, a partial mode flag or bit (e.g., PartialKernel) may be set/ cleared to represent the state of fetch/partial mode 306 (or just fetch mode 206). If the system in in fetch/partial mode 306, the UOC miss may be retrieved via the IFU/IDU pipeline, but instead of returning to filter mode 299, the system may stay in fetch/partial mode 306.

Conversely, if the partial mode flag or bit (e.g., PartialKernel) indicates that the system is not in fetch/partial mode 306, the system may exit fetch/partial mode 306 and return to filter mode 299. In such an embodiment, the successful fetch counter (e.g., ActiveFetch) may be reset to a default value (e.g., zero).

In addition, the system may also attempt to determine if it should enter fetch/partial mode 306. Block 308 illustrates that, in one embodiment, the system may perform and monitor UOC activity to prepare for or perform bookkeeping on the partial mode counters and flags.

Block 341 illustrates that, in one embodiment, a determination may be made as to whether partial mode 306 is desirable. In one embodiment, this include detecting if (1) the system is in fetch mode 206, (2) the system is not in partial mode 306 (i.e., the partial mode flag or bit (e.g., PartialKernel) is not set), and (3) a UOC miss has occurred. If that condition is not met, the system may loop back and perform no further operation (saving computing resources). However, if that condition is met the system may continue its bookkeeping operations.

Block 342 illustrates that, in one embodiment, a determination may be made as to whether or not progress is being made or advantage is being gained by staying in fetch/partial mode 306. In one embodiment, this may be done by comparing the current value of the successful fetch counter (e.g., ActiveFetch) to the value the successful fetch counter had during the last UOC miss (e.g., LastActiveFetch). It is understood that the above is merely one illustrative example to which the disclosed subject matter is not limited.

Block 344 illustrates that, in one embodiment, if progress or improvements have been made the various counters and flags may be reset. In such an embodiment, the counter or memory that indicates the value the successful fetch counter had during the last UOC miss (e.g., LastActiveFetch) may be replaced with the current value of the successful fetch counter (e.g., ActiveFetch). Also, a lack-of-progress flag of bit (e.g., NoProgress) may be cleared.

Blocks 345 and 346 illustrates that, in one embodiment, if no progress or improvements have been made the various counters and flags may be incremented and then compared to a threshold value. In the illustrated embodiment, lack-of-progress flag of bit (e.g., NoProgress) may be incremented and the compared to a threshold value. In various embodiments, the threshold value may indicate when the system has essentially given up hope that the kernel may be fully stored in the UOC and has determined that the partial kernel is good enough.

Block 347 illustrates that, in one embodiment, that the partial mode flag or bit (e.g., PartialKernel) may then be set. As described above, the partial mode flag may prevent the system from exiting fetch mode 206 or 306 on a UOC tag miss. Instead it will switch out of the UOC, fetch the normal IFU/IDU path, then jump back into the UOC for the remainder of the partial kernel. In this case, only a BuildEdge ratio increase (Block 238) will cause the system to exit fetch/partial mode 306, as it indicates the kernel has moved to a new phase.

Figure 4:
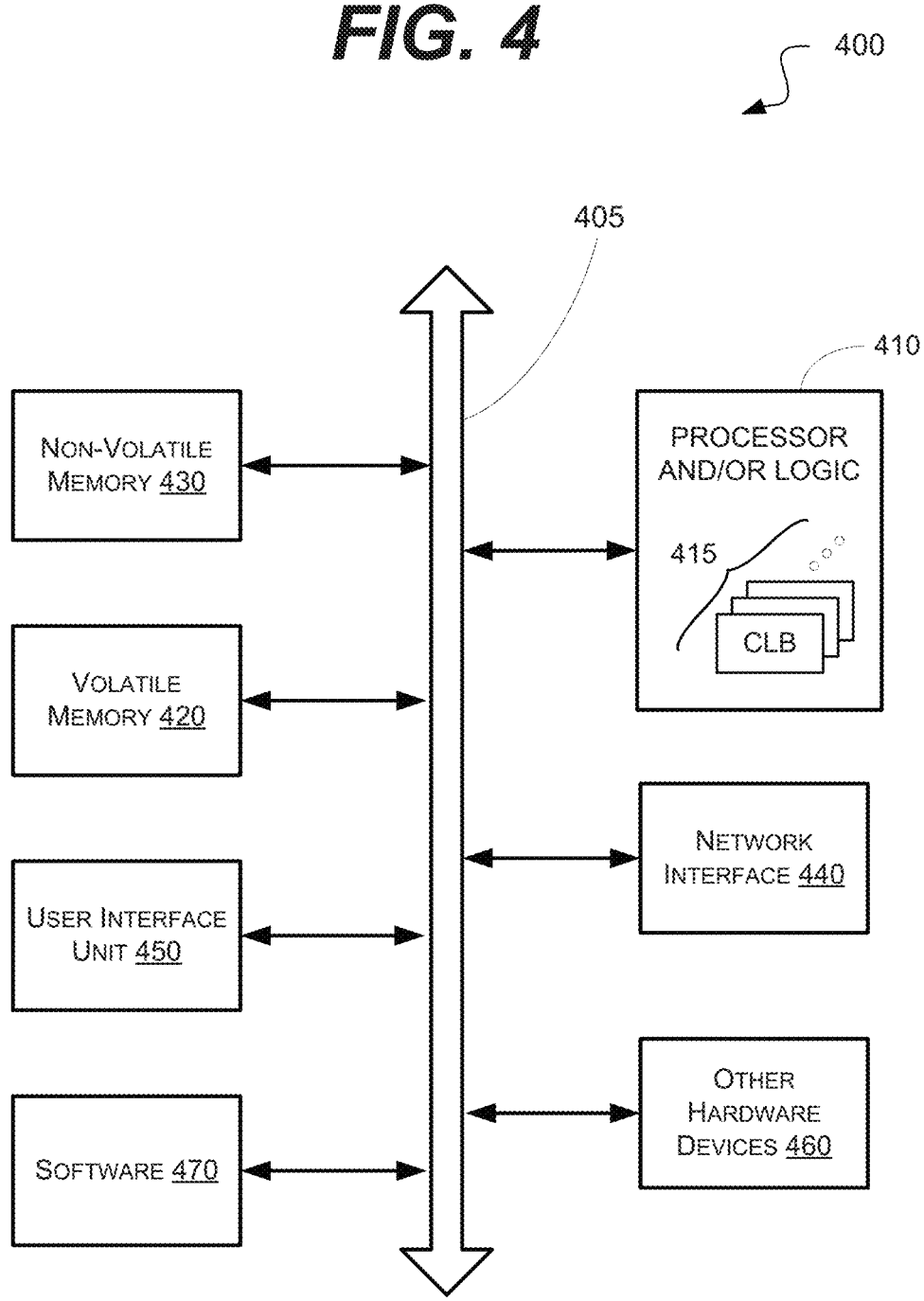
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
    an instruction fetch unit circuit configured to retrieve instructions from a memory;
    an instruction decode unit configured to convert instructions into one or more micro-operations that are provided to an execution unit circuit;
    a micro-operation cache configured to store micro-operations; and
    a branch prediction circuit configured to:
        determine that a kernel of instructions is repeating, wherein a kernel of instructions includes a plurality of related instructions,
        store at least a portion of the kernel within the micro-operation cache, and
        provide the stored portion of the kernel to the execution unit circuit without the further aid of the instruction decode unit circuit,
    wherein the apparatus is configured to, in response to an amount of the kernel being stored in the micro-operation cache that exceeds a threshold value that is greater than or equal to one-half of the kernel, powering down, at least partially, the instruction decode unit.

2. The apparatus of claim 1, wherein the branch prediction circuit is configured to operate in one or at least three modes:
    a filter mode that includes the branch prediction circuit making the determination as to when a kernel of instructions is repeating is made;
    a build mode that includes the branch prediction circuit storing at least a portion the kernel; and
    a fetch mode that includes the branch prediction circuit provides the kernel, from the micro-operations cache, to the execution unit.

3. The apparatus of claim 2, wherein the branch prediction circuit is configured to employ a form of hysteresis to switch between fetch mode and another mode.

4. The apparatus of claim 2, wherein the branch prediction circuit is configured to, if a miss to the micro-operations cache occurs, transition from fetch mode to filter mode.

5. The apparatus of claim 2, wherein the fetch mode includes a partial kernel mode; and
    wherein the partial kernel mode is configured to prevent a transition out of fetch mode due to a cache miss and causes the apparatus to fetch a missed micro-operation via the instruction decode unit and then, for subsequent micro-operations, provide the stored portion of the kernel to the execution unit circuit from the micro-operations cache.

6. The apparatus of claim 5, wherein if the branch prediction circuit transitions between the build mode and fetch mode more than a threshold number of times, the branch prediction mode may enter the partial kernel mode.

7. The apparatus of claim 1, wherein the branch prediction circuit includes:
    a time-out counter to enforce a minimum amount of time to fetch and store the kernel within the micro-operations cache; and
    an amount stored counter to indicate how much of the kernel is stored in the micro-operations cache.

8. The apparatus of claim 1, wherein the branch prediction circuit is configured to, if a miss to the micro-operations cache occurs, cause an associated micro-operation to be provided by the instruction decode unit.

9. A system comprising:
    an instruction cache configured to store instructions;
    an instruction fetch and decode circuit configured to:
        retrieve instructions from the instruction cache, and
        convert instructions into one or more micro-operations that are provided to an execution unit circuit;
    a micro-operation cache configured to store micro-operations; and
    a branch prediction circuit configured to:
        determine that a kernel of instructions is repeating, wherein a kernel of instructions includes a plurality of related instructions,
        store at least a portion of the kernel within the micro-operation cache, and
        provide the stored portion of the kernel to the execution unit circuit without the further aid of the instruction cache, wherein the system is configured to, in response to an amount of the kernel being stored in the micro-operation cache that exceeds a threshold value that is greater than or equal to one-half of the kernel, powering down, at least partially, the instruction cache.

10. The system of claim 9, wherein the branch prediction circuit is configured to operate in one or at least three modes:
a filter mode that includes the branch prediction circuit making the determination as to when a kernel of instructions is repeating is made;
a build mode that includes the branch prediction circuit making a majority of the kernel is stored; and
a fetch mode that includes the branch prediction circuit making the kernel is provided, from the micro-operations cache, to the execution unit.

11. The system of claim 10, wherein the branch prediction circuit is configured to employ a form of hysteresis to switch between fetch mode and another mode.

12. The system of claim 10, wherein the branch prediction circuit is configured to, if a miss to the micro-operations cache occurs, transition from fetch mode to filter mode.

13. The system of claim 10, wherein the fetch mode includes a full kernel variant and a partial kernel variant;
wherein if, when operating in the full kernel variant, a micro-operation cache miss is encountered the branch prediction unit transitions from fetch mode to filter mode;
wherein if, when operating in the partial kernel mode, a micro-operation cache miss is encountered the branch prediction unit stays in fetch mode.

14. The system of claim 13, wherein during the partial kernel variant, if a micro-operation cache miss occurs, the system fetches a missed micro-operation via the instruction fetch and decode unit and then, for subsequent micro-operations, provides the stored majority of the kernel to the execution unit circuit from the micro-operations cache.

15. The system of claim 9, wherein the branch prediction circuit includes:
a time-out counter to enforce a minimum amount of time to fetch and store the kernel within the micro-operations cache; and
an amount stored counter to indicate how much of the kernel is stored in the micro-operations cache.

16. The system of claim 9, wherein the branch prediction circuit is configured to, if a miss to the micro-operations cache occurs, cause an associated micro-operation to be provided by the instruction fetch and decode circuit.

17. An apparatus comprising:
an instruction cache to store instructions; and
an instruction fetch pipeline circuit configured to provide instructions, from the instruction cache to an execution unit circuit, wherein the instruction fetch pipeline circuit comprises:
a first instruction path comprising:
a fetch circuit configured to retrieve instructions from the instruction cache, and
a decode circuit configured to convert the instructions into one or more micro-operations and supply the micro-operations to the execution unit circuit, and
a second instruction path comprising:
a micro-operation cache configured to store micro-operations, and
a branch prediction circuit configured to:
determine that a kernel of instructions is repeating,
store at least a portion of the kernel within the micro-operation cache, and
provide the stored portion of the kernel to the execution unit circuit when the first instruction path is in a low power mode, in response to a threshold amount that is equal to a majority of the kernel being stored in the micro-operation cache.

18. The apparatus of claim 17, wherein the branch prediction circuit comprises a branch graph predictor that employs a branch edge detector circuit to determine if the kernel is resident in the micro-operation cache.

* * * * *